United States Patent [19]

Amberg et al.

[11] Patent Number: 4,668,048
[45] Date of Patent: May 26, 1987

[54] THERMAL INSULATION FOR HEAT SENSITIVE LENS ELEMENTS

[75] Inventors: Karl-Heinz Amberg, Aalen; Joachim Kämmerer, Oberkochen, both of Fed. Rep. of Germany

[73] Assignee: Carl-Zeiss-Stiftung, Heidenheim on the Brenz, Fed. Rep. of Germany

[21] Appl. No.: 757,314

[22] Filed: Jul. 22, 1985

[30] Foreign Application Priority Data

Jul. 28, 1984 [DE] Fed. Rep. of Germany ....... 3427968

[51] Int. Cl.$^4$ .......................... G02B 7/02; G02B 23/16
[52] U.S. Cl. ..................................... 350/253; 350/580
[58] Field of Search ............... 350/253, 580, 588, 607; 372/34

[56] References Cited

U.S. PATENT DOCUMENTS

| 1,540,781 | 6/1925 | Keuffel | 350/253 |
| 1,791,254 | 2/1931 | Brockdorff | 350/253 |
| 2,376,710 | 5/1945 | Maurer | 350/588 |
| 3,553,604 | 1/1971 | Andress et al. | 372/34 |
| 3,609,236 | 9/1971 | Heilman | 350/253 |
| 4,534,624 | 8/1985 | Toda et al. | 350/429 |

FOREIGN PATENT DOCUMENTS

| 2643922 | 3/1978 | Fed. Rep. of Germany | 372/34 |
| 36023 | 3/1977 | Japan | 350/580 |

Primary Examiner—William H. Punter

Attorney, Agent, or Firm—Stonebraker, Shepard & Stephens

[57] ABSTRACT

A long focal length or telephoto lens for photographic purposes has an optical element with a high coefficient of thermal expansion, and special features to impede transmission of heat to this element when the housing of the lens becomes heated by rays of the sun. A thermal insulation bridge, preferably of ceramic material, is interposed in the heat flow path from the rear part of the housing to the lens tube which contains the sensitive optical element. Moreover, this lens tube is spaced inwardly a substantial distance from the surrounding front part of the housing, to provide a substantial air space between tube and housing, with air inlet and outlet openings for circulation of air. The outer surface of the lens tube has a heat reflective coating, to reflect rather than absorb heat radiated inwardly from the surrounding housing when the housing becomes heated by rays of the sun. By using these features, it becomes practical to dispense with a heat reflecting coating on the outer surface of the housing, sometimes used when a sensitive optical element needs to be protected from heat of the sun's rays, such an external coating being undesirable because it makes the lens conspicuous and therefore unsuitable for some kinds of photography. Using the special heat-impeding features of this invention, the outer surface of the housing can be black and inconspicuous, even though the black surface absorbs more heat from the rays of the sun than a lighter colored heat reflective surface.

2 Claims, 2 Drawing Figures

THERMAL INSULATION FOR HEAT SENSITIVE LENS ELEMENTS

This invention relates to photographic lenses having one or more lens elements that are especially sensitive to heat, having a relatively high coefficient of thermal expansion so that the shape of the lens element may become distorted when overheated by rays of the sun or otherwise. The invention provides thermal insulation to prevent or at least reduce the heating of the sensitive lens element or elements. The invention is particularly useful with lenses of relatively long focal length, commonly called telephoto lenses, whether of the zoom type or of the fixed focal length type.

Optical elements with a high coefficient of thermal expansion are used primarily in long focal length lenses for correcting the secondary spectrum. Changes in temperature result in slight changes in the shape of these optical materials, leading to changes in the lens power, which causes a shift in the focusing of an object, i.e., an object previously properly focussed is now out of focus.

These changes in shape of the lens are especially noticeable when the lens is heated due to direct rays of the sun. It is already known to counteract the action of the sun's rays by giving the external surface of the lens mount or housing a light tint or color, so that the sun's rays are reflected to a greater extent and absorbed to a lesser extent. However, this light tint or color has the disadvantage that it makes the lens mount or housing more conspicuous. This is undesirable when one wishes to take pictures unobtrusively without attracting attention, and is especially undesirable in nature photography of animals, where a bright object, such as reflection of sunlight from a light colored objective housing, may scare an animal away or discourage it from approaching closer.

The object of the present invention is to minimize the change in shape of a heat sensitive lens element or component, by means other than the light coloring or tinting of the external surface of the housing, so that the external surface may be of a black or dark color so as to be inconspicuous, without thereby subjecting the sensitive lens element to excessive heat variations resulting in undesirable changes in shape.

SUMMARY OF THE INVENTION

The above mentioned object is achieved, according to the invention, by providing insulating bridges between the lens element or elements which are to be protected and the parts of the lens which receive the rays of the sun and are heated thereby. In a preferred embodiment of the invention, the insulating bridges are made of ceramic material.

It is also preferred to provide an air space between the outer housing and the lens tube or other holding device on which the lens element to be protected is mounted. Additionally, the outer surface of the lens tube has a light colored reflective coating, to reflect rather than absorb incoming radiant heat to the maximum extent. The light color of this reflective coating does not make the objective conspicuous, since it is not seen, being surrounded by the outer housing. Preferably air passages are also provided, for flow of air through the air space between the lens mounting tube and the outer housing.

The advantages of this invention include the fact that the insulating bridges are easy to manufacture and install, and they make it possible and practical to use glass or optical crystal with relatively high coefficient of thermal expansion in telephoto lenses or objectives, without the external appearance being conspicuous.

BRIEF DESCRIPTION OF THE DRAWINGS

A preferred embodiment of the invention is illustrated in the accompanying drawings, in which.

DESCRIPTION OF THE PREFERRED EMBODIMENT

Figure 1:
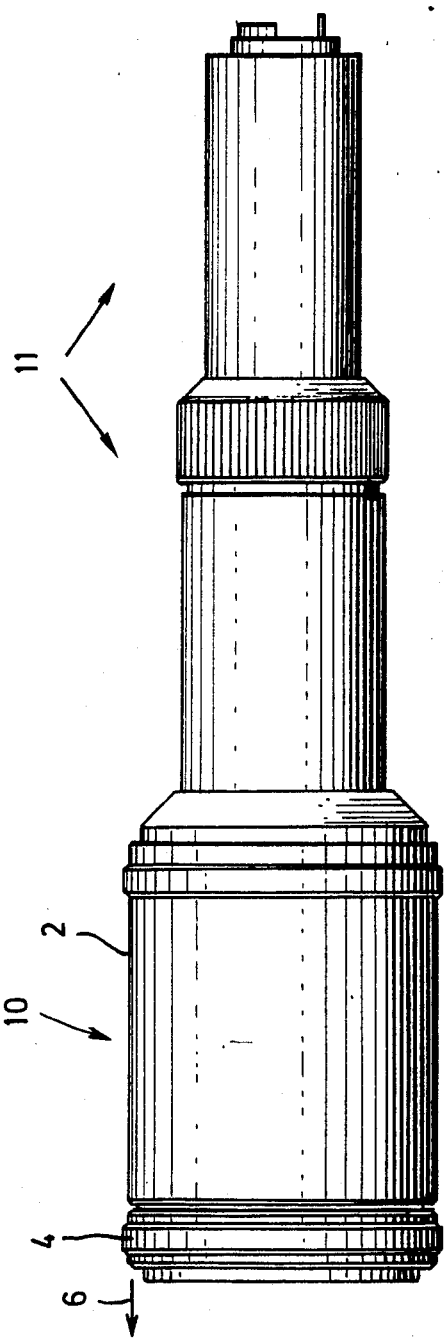
FIG. 1 is a side elevational view of a telephoto lens or objective embodying the invention.

Referring first to FIG. 1, the objective (usually called simply the lens) has a front portion indicated in general at 10, and a rear portion, indicated in general at 11. The lens elements or components which have a relatively high coefficient of thermal expansion and need to be protected as much as possible from heat from the rays of the sun are mounted in the front portion 10. The rear portion 11 may be of conventional construction, and need not be further described.

The outer tube or housing of this front part 10 is shown at 2. There is a lens shade 4, telescopically mounted within the housing tube 2 so as to be pulled forward in the direction of the arrow 6 when its use is required.

Figure 2:
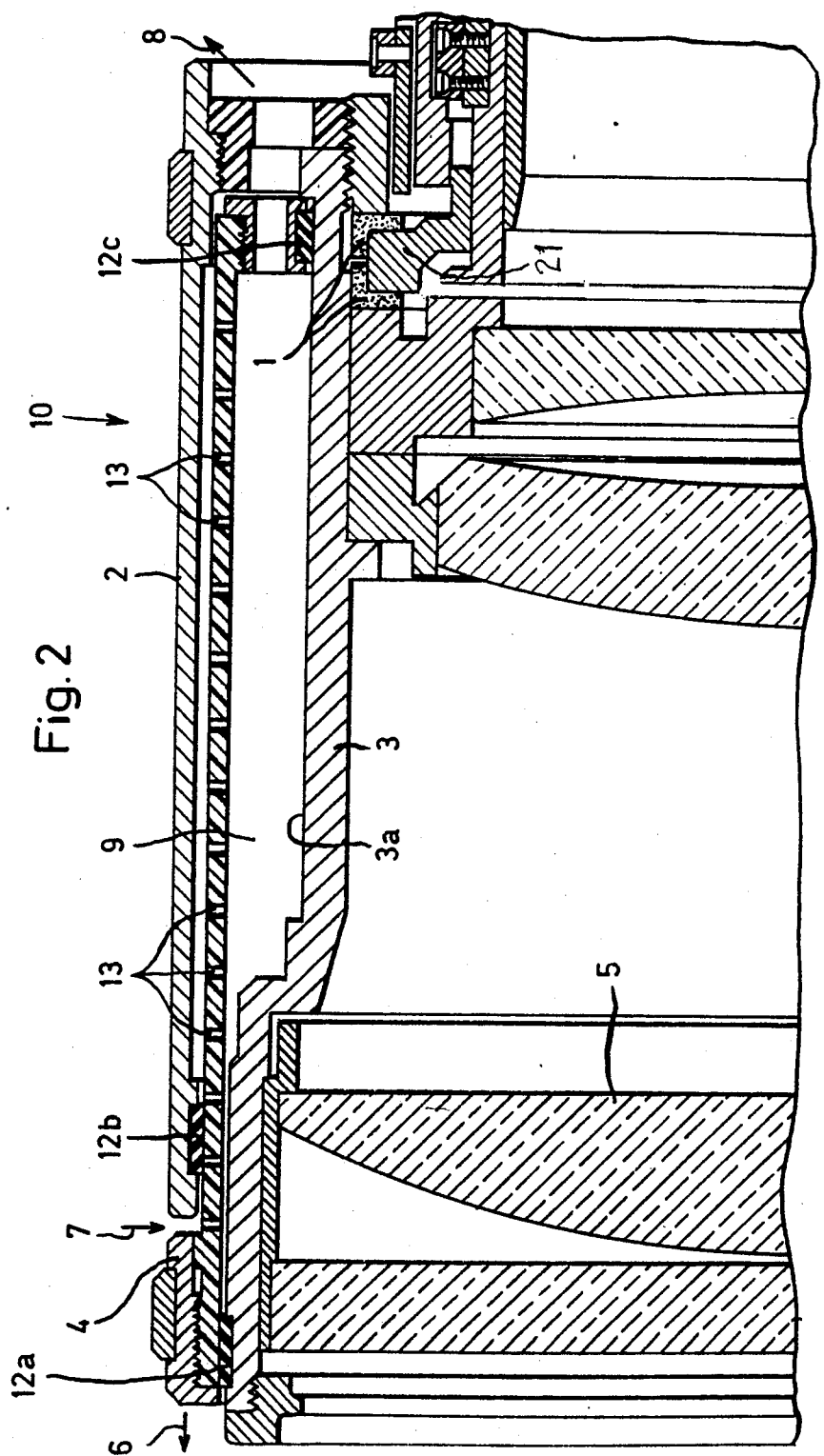
FIG. 2 is a fragmentary longitudinal section taken through a portion of the objective shown in FIG. 1, illustrating details.

Referring now to FIG. 2, a lens holder or mounting tube 3 within the housing 2 serves to hold any desired number of optical elements or components, of any desired known or conventional construction, among them being the element designated 5, which has a relatively high coefficient of thermal expansion, for the purpose of correcting the secondary spectrum.

The housing 2, as well as the corresponding housings or external tubes of the rear portion 11 of the lens, are made of metal, as is the common practice. The lens tube 3 is also of metal. In the conventional prior-art construction, these metal parts have a direct metal-to-metal contact with each other, which means that heat is easily transmitted from one to another. Thus not only the heat from the sun's rays on the forward part 10, but also the heat from the sun's rays on the long rear part 11 of the lens is transmitted easily to the lens mounting tube 3 and adversely affects the heat sensitive optical element 5. In a long focal length lens, the rear tubular portion 11 of the lens structure is necessarily quite long, in order to space the optical elements at the front of the lens far enough from the focal plane of the camera with which the lens is used. So there is no escaping this long metallic tube which absorbs heat from the rays of the sun and transmits the heat, by metal-to-metal contact (in the typical prior art construction) to the lens mounting tube 3 and thence to the sensitive optical element or elements.

In the lens of the present invention, however, this transmission of heat by metal-to-metal contact from the housing of the rear part 11 to the lens tube 3 of the front part is reduced by providing insulating bridges of low heat transmission material in at least some if not all of the heat transmission paths. The metallic ring 21 of the front lens portion 10, which makes contact with the metal parts of the next rearward portion 11 and which constitutes the principal heat transmitting path between these portions of the lens, does not make direct metal contact with the metallic lens tube 3 but, instead, is mounted to the tube 3 by the bridge pieces 1 made of material having a low coefficient of heat transmission, preferably of ceramic material.

Conveniently, these bridge pieces are rings which are L-shaped in radial cross-section, as illustrated. As seen near the right end of FIG. 2, each of these L-shaped rugs 1 has a cylindrical flange and a radial flange. Using two such rings, with the metal ring 21 embraced by the flanges of the bridge rings 1 as clearly seen in FIG. 2, the metal ring is securely held in proper position relative to the lens tube 3, but without having any metal-to-metal contact with the tube 3. Various ceramic materials may be used for these bridge pieces. A satisfactory material is the same ceramic commonly used in ceramic cooking utensils.

As already mentioned above, the outer surface 3a of the lens mounting tube 3 has a light reflecting coating, so that heat radiating inward from the outer sheath or housing 2 will be reflected back outwardly as much as possible, instead of being absorbed by the lens tube 3 and raising the temperature thereof.

The lens shade 4, which is moved forwardly in the direction of the arrow 6 to a shading position when needed, slides between two felt rings, 12a mounted in a circumferential groove on the exterior of the lens tube 3, and 12b mounted in a circumferential groove around the interior of the housing member 2. At the rear end of the lens shade it has a spacing ring with a circumferential groove around its interior surface, and a felt ring 12c mounted in this groove slides on the exterior surface of the lens tube 3 as the shade member 4 is moved forwardly and backwardly.

The tube of the lens shade 4 is provided with air slots 13 at intervals throughout its length. In any position to which the shade may be pulled out (forward) in use, air can flow in through the slots, into the space 9 between the shade tube and the lens tube 3, and flow along this space 9 and out through the openings at the rear of the front lens part 10, in the direction of the arrow 8. This air flow will help to cool the lens tube 3 and the sensitive optical element within it. The flow could, of course, be reversed, coming in at 8 and out at 7.

The heat-sensitive optical element may be of any known composition, the details of which are not important for purposes of the present invention. However, for the sake of giving a specific example of a satisfactory material, this optical element may be made of the glass designated as FK 51-487 845, listed in the Schott glass catalog. This glass has a coefficient of thermal expansion of $13.6 \times 10^{-6}$ per degree C., much higher than that of normally used optical glass, which is usually between 5 and 8 times $10^{-6}$ per degree C. In view of this much greater sensitivity to heat, it will be readily seen how important it is to reduce as much as possible the transmission of heat produced by the sun's rays, from the heated housing or casing to the sensitive lens element or elements, such as the element 5 in FIG. 2.

What is claimed is:

1. A photographic objective of relatively long focal length comprising:
   (a) a housing having a front part of larger diameter and a rear part of smaller diameter;
   (b) a lens tube within said front part of said housing;
   (c) said lens tube being spaced inwardly from said housing to provide a substantial air space between them throughout at least a major portion of the length of said lens tube;
   (d) an optical element having a high coefficient of thermal expansion mounted in said lens tube;
   (e) a coating of heat reflective material on the outer surface of said lens tube to reflect heat radiating inwardly from the surrounding housing when the surrounding housing becomes heated by rays of the sun, thereby to help to protect said optical element from heat;
   (f) means forming air entrance and exit passages for circulation of air through said air space, thereby to help protect said optical element from heat; and
   (g) thermal insulation bridge means formed essentially of ceramic material interposed between said lens tube and said rear part of said housing in position to impede flow of heat to said lens tube from said rear part, when heated by rays of the sun, thereby to help protect said optical element from heat.

2. The invention defined in claim 1, wherein said bridge means comprises two ring members each having an L-shaped radial cross section so as to have a cylindrical flange and a radial flange, mounted with their cylindrical flanges faced toward each other and engaging said lens tube and with their radial flanges spaced axially from each other and embracing between them a ring member connected to said rear part of said housing.

* * * * *